Nov. 18, 1941. S. P. TSCHAPPAT Re. 21,952

TUBING HANGER

Original Filed Feb. 15, 1926 2 Sheets-Sheet 1

INVENTOR.
SHERIDAN P. TSCHAPPAT,
BY B. P. Whitmore
ATTORNEY.

Nov. 18, 1941. S. P. TSCHAPPAT Re. 21,952

TUBING HANGER

Original Filed Feb. 15, 1926 2 Sheets-Sheet 2

INVENTOR.
SHERIDAN P. TSCHAPPAT,
BY B. P. Wilburne
ATTORNEY.

Reissued Nov. 18, 1941 Re. 21,952

UNITED STATES PATENT OFFICE 21,952

TUBING HANGER

Sheridan P. Tschappat, Tulsa, Okla., assignor of one-half to Harold Callahan, Independence, Kans.

Original No. 1,830,893, dated November 10, 1931, Serial No. 286,403, June 18, 1928, which is a continuation of application Serial No. 88,272, February 15, 1926. Application for reissue July 12, 1940, Serial No. 345,208

9 Claims. (Cl. 166—14)

My invention relates to tubing hangers, used in connection with oil wells.

My invention embodies a tubing hanger which suspends the tubing on the casing head, at the top of the well by means of slips which grip around the tubing, as distinguished from the old method of hanging the tubing by engaging the coupling of the tubing. My device also provides reliable and simple means to pack off gas and fluid between the casing head and tubing, where there is considerable pressure. I may also provide a hanger embodying a bowl which will depend into the casing head, allowing more room for the pumping operation above the casing head. An important feature of the invention is the provision of pairs of spaced recesses in the top of the slips, affording a finger grip and this finger grip may have an opening formed therein, whereby a temporary handle may be conveniently attached thereto.

A further feature of the invention is the forming of a recess or stop for the rubber packing, which is afforded by the top of the slips and a small shoulder in the bowl or casing.

A further feature of the invention is the provision of a compression ring which may be drawn tightly down upon the rubber packing forming a gas-tight joint. A further feature of the invention is the provision of a hanger embodying a bowl that projects down into the casing head, instead of extending above the same, thus leaving more room for the pumping operation directly above it.

Figure 1:
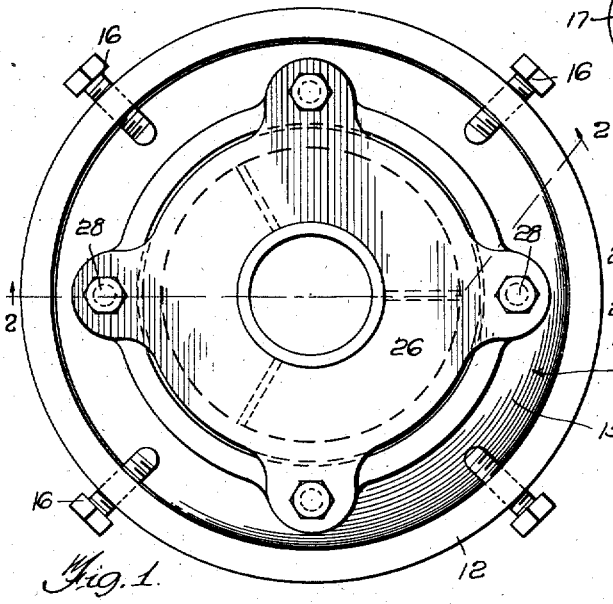
Figure 6:
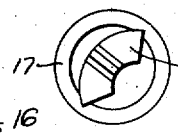
Figure 3:
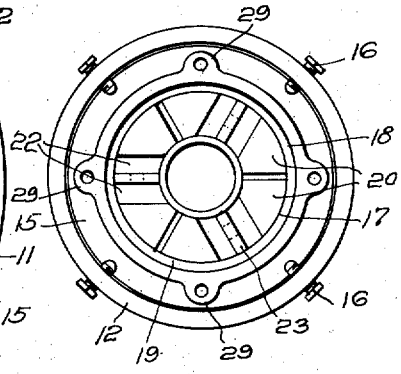
Figure 4:
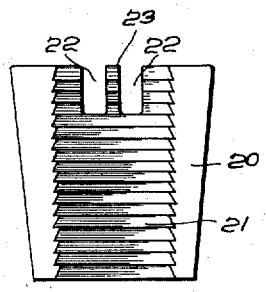
Figure 2:
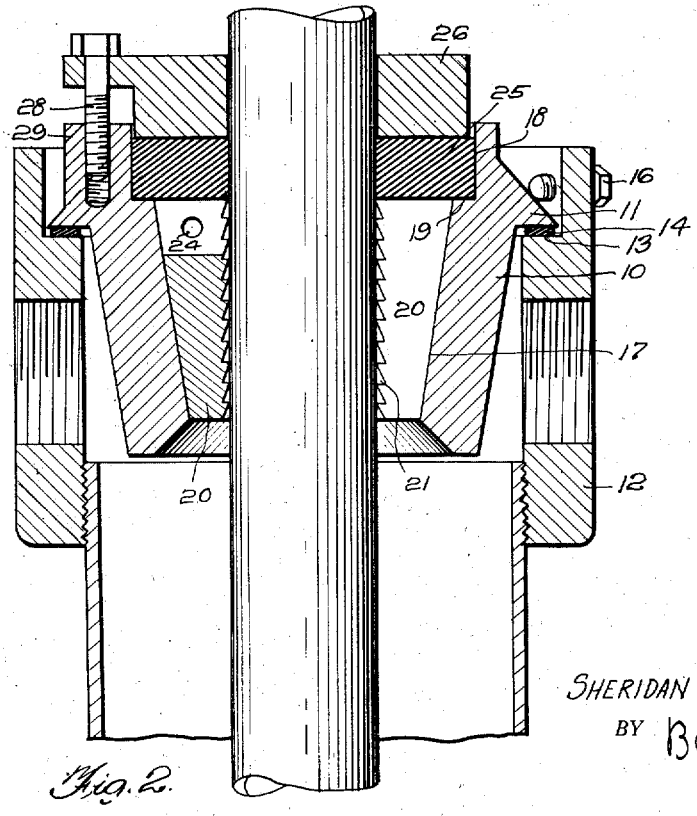
Figure 5:
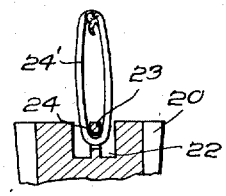
Figure 7:
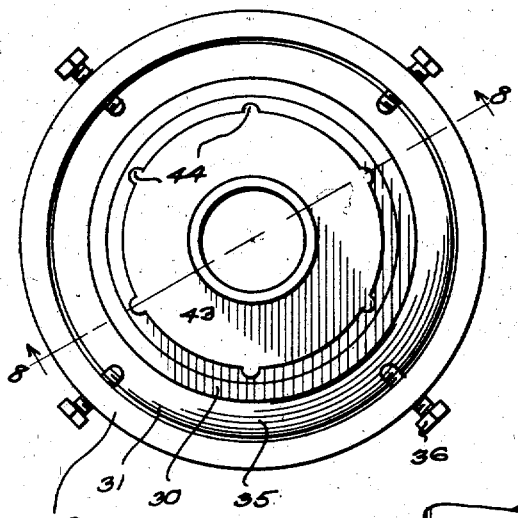
Figure 9:
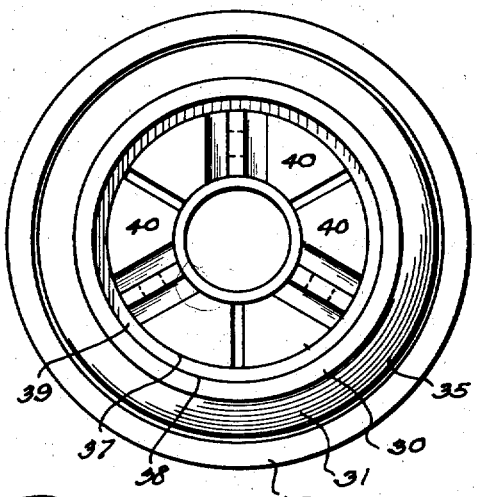
Figure 8:
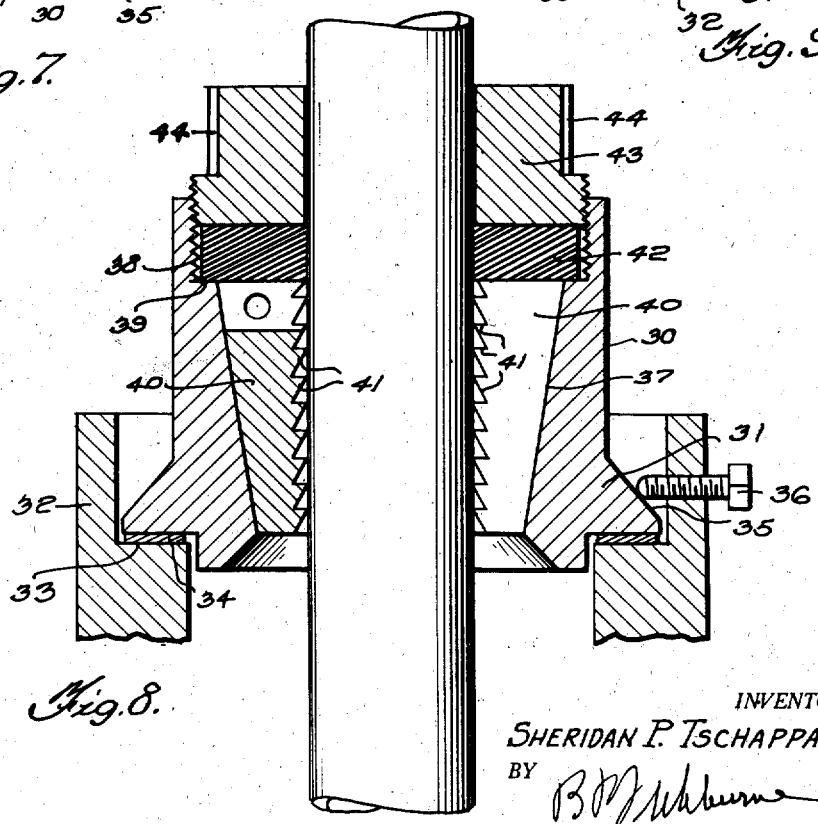

In the accompanying drawings, forming a part of this specification, and in which like numerals are employed to designate like parts throughout the same, Figure 1 is a plan view of a tubing hanger embodying my invention, Figure 2 is a vertical section taken on line 2—2 of Figure 1, Figure 3 is a plan view of the hanger, the packing ring and compression ring being omitted, Figure 4 is a side elevation of one of the slips, Figure 5 is a detailed section through one of the slips showing the finger grip element, Figure 6 is a partly diagrammatic view, showing the relative width of each slip, Figure 7 is a plan view of a tubing hanger embodying a modified form of my invention, Figure 8 is a vertical section taken on line 8—8 of Figure 7, and Figure 9 is a plan view of the hanger, the packing ring and compression ring being omitted.

The present application is a continuation of my co-pending application for Tubing hanger, filed February 15, 1926, Serial No. 88,272. My co-pending application for Tubing hanger, Serial No. 88,272, filed February 15, 1926, is consolidated with the present application, Serial No. 286,403.

Attention being called to Figures 1 to 5, inclusive, the numeral 10 designates a tapered cylindrical casing or bowl, decreasing in diameter downwardly, and provided near its top with an outwardly projecting flange 11, to be seated within the top of a casing head 12, above the shoulder 13 thereof, with suitable packing 14, between these parts, as shown.

The flange 11 has an inclined face 15, to be engaged by bolts 16, to firmly clamp the casing or bowl in place. The casing or bowl 10, therefore, depends into the casing head, thereby affording more room for the pumping operation, above the casing head.

The casing or bowl 10 is provided with a downwardly tapered opening or bore 17, and at the top of this bore, with an enlarged cylindrical opening or bore 18, which affords a horizontal shoulder 19. Adapted to operate within the tapered bore 17 are segmental tapered sliding slips 20, having serrations 21, as shown. At its top, each slip is provided with a pair of recesses 22, forming a finger grip portion 23. The recesses 22 are sufficiently large to permit of the fingers being inserted therein, to engage the finger grip 23. This finger grip is, of course, preferably integral with the slip and the finger grip is provided with a transverse opening 24, by means of which a cable 24' or other temporary support may be conveniently attached, to the finger grip.

As clearly shown in Figure 6, the diameter of the lower end 17' of the tapered bore 17 is slightly smaller than the width of the upper end of each slip, thereby rendering it impossible for any of the slips to drop from the bowl into the tubing. This eliminates the possibility of an expensive operation of fishing the tool out of the well.

The numeral 25 designates a compressible packing ring, preferably formed of rubber, which is adapted to rest upon the top of the slips and the shoulder 19, and to be pressed against the same by a compression ring 26, adapted to enter the top of the bowl, as shown. This compression ring 26 is moved downwardly by bolts 28, engaging therewith, and having screw-threaded engagement within lugs 29, formed upon the top of the bowl.

In the use of the device, the casing or bowl 10 is arranged within the casing head 12, and depends into the same. The bowl extends for only a slight distance above the top of the casing head, whereby the maximum space is afforded above the casing head for the pumping operation or the like. When the bolts 28 are screwed up, the compressible packing ring 25 is compressed, forming a gas-tight joint with the shoulder 19, the tops of the slips, and the tubing. Further, the packing ring, while under compression, serves to force the slips downwardly into clamping engagement with the tubing, thereby further reducing the possibility of the tubing slipping.

In Figures 7 to 9, inclusive, I have shown a modification of the invention, wherein the numeral 30 designates a preferably cylindrical casing or bowl, provided near its bottom with an outwardly projecting flange 31, to be seated within the top of a casing head 32, above the shoulder 33 thereof, with suitable packing 34, between these parts, as shown. The flange 31 has an inclined face 35, to be engaged by bolts 36, to firmly clamp the casing or bowl in place.

The casing or bowl 30 is provided with a downwardly tapering opening or bore 37, and at the top of this bore, with an enlarged cylindrical opening or bore 38, which is screw-threaded, and affords a shoulder 39. Adapted to operate within the tapered bore 37 are segmental slips 40 having serrations 41. These slips are identical with the slips 20 hereinbefore described.

The numeral 42 designates a compressible packing ring, preferably formed of rubber, which is adapted to rest upon the top of the slips 40 and shoulder 39, and to be compressed against the same by a compression ring 43, having screw-threaded engagement within the screw-threaded bore 38 as shown. The compression ring is provided with radial projections 44, so that it may be conveniently turned.

In the use of the device, the casing or bowl may be applied to the casing head, as indicated in Figure 8. When the compression nut 43 is screwed down, the packing ring 42 will be compressed against the top of the slips and the shoulder 39, and a gas-tight joint will be effected.

It is to be understood, that the forms of my invention, herewith shown and described, are to be taken as preferred examples of the same, and that various changes in the shape, size and arrangement of parts, may be resorted to without departing from the spirit of my invention, or the scope of the subjoined claims.

What I claim and desire to secure by Letters Patent is:

1. A combined tubing hanger and packing off device, comprising a bowl having a bore with a tapered part, the upper end of the bore being open, slips arranged within the tapered part of the bore for engagement with a tubing, the upper ends of the slips terminating at an elevation beneath the top of the bore of the bowl, a compressible packing ring disposed within the upper portion of the bore above the tops of the slips, said packing ring serving to force the slips downwardly into engagement with the tubing and also forming a gas-tight joint with the bowl and tubing, a compression ring arranged above the packing ring to force it downwardly with relation to the bowl, the arrangement being such that access may be had to the packing ring by adjustment of the compression ring without raising or disconnecting the tubing or stopping the operation of the well.

2. A combined tubing hanger and packing off device, comprising a bowl separate from the casing head and having an exterior flange so that the bowl may be supported by the casing head, said bowl having a bore with a tapered part, slips arranged within the tapered part of the bore to engage with a tubing, a compressible packing ring arranged adjacent to the top of the bowl and disposed above the slips, said packing ring forming a gas-tight joint with the bowl and the tubing, and adjustable means to exert a downward pressure upon the packing ring, the construction of such means and the location of the packing ring being such that access may be had to the packing ring without raising or disconnecting the tubing or stopping the operation of the well.

3. In a combined tubing hanger and fluid packing off device, a bowl having a tapered bore and an enlarged bore near the upper end of the tapered bore to form a shoulder, slips slidable in the tapered bore, for engaging with a tubing, a compressible packing ring surrounding the tubing and engaging the tops of the slips and the shoulder, a compression ring arranged above the packing ring, to force the same downwardly, and means whereby the compression ring may be moved downwardly with relation to the tubing to compress the packing ring.

4. In a combined tubing hanger and packing off device, a bowl having a bore which is tapered, a plurality of sliding slips operating within the tapered bore for engaging with a tubing, a compressible packing ring surrounding the tubing within the bowl above the slips and engaging the tops of the slips, said packing ring serving to force the slips downwardly into engagement with the tubing and also being adapted to form a gas-tight joint with bowl, a compression ring arranged above the packing ring to force the same downwardly and means whereby the compression ring may be moved downwardly with relation to the bowl to compress the packing ring.

5. A combined tubing hanger and packing off device, comprising a bowl separate from the casing head and having an exterior flange arranged near its upper end so that the bowl may be supported from the casing head and having the major portion of its length arranged within the casing head, said bowl having a bore with a tapered part, slips arranged within the tapered part of the bore to engage with a tubing, a compressible packing ring arranged adjacent to the top of the bowl and disposed above the slips, said packing ring forming a gas-tight joint with the bowl and the tubing, a compression ring arranged above the packing ring to force the same downwardly and having means whereby the same may be moved downwardly with relation to the bowl to compress the packing ring, said compression ring extending a relatively short distance above the top of the bowl.

6. A combined tubing hanger and packing off device, comprising a bowl having a bore with a tapered part, a plurality of slips within the tapered part of the bore for engaging a tubing, a compressible packing ring arranged adjacent to the top of the bowl and disposed immediately above and in contact with the slips so as to prevent the slips from sliding upwardly, said packing ring serving to form a gas-tight joint with the bowl and tubing, and adjustable means to exert a downward pressure upon the packing ring, such means being so constructed that access may be had to the packing ring without raising or disconnecting the tubing or stopping the operation of the well.

7. In a combined tubing hanger and pack-off device, a bowl having a bore with a tapered part, slips slidable in the tapered part of the bore for engaging a tubing, a compressible packing ring arranged immediately above and in contact with the slips and in close relation with the bowl and tubing, a compression ring arranged above the packing ring to force the same downwardly and having screw-threaded engagement with the upper portion of the bowl and having a part arranged exteriorly of the bowl, such exterior part being adapted for engagement with a tool for turning the same.

8. In a combined tubing hanger and packing off device, a bowl having a bore with a tapered part, slips slidable in the tapered part of the bore for engaging a tubing, a compressible packing ring resting upon the slips and in close relation with the bowl and tubing, and a compression ring arranged above the packing ring to force the same downwardly and having screw-threaded engagement with the upper portion of the bowl.

9. A combined tubing hanger and packing off device including, an annular body having an inclined bowl formed within its bore, an annular shoulder within said body at the upper end of said bowl, slips slidable in the bowl for engaging a well tubing, said slips being disposed so that their tops project in substantially the same plane as said shoulder, an annular elastic packing element surrounding the tubing and having its marginal portion supported on the shoulder and its remaining portion supported on the slips, whereby said element is disposed above the slips, and adjustable means in the upper portion of the body above the packing element and arranged to be moved downwardly to firmly clamp the marginal portion of the element between said shoulder and said means, the location of the shoulder at the upper end of the bowl serving to support the packing element in the event the slips move a slight distance downwardly due to the weight of the tubing, whereby the packing element is maintained sufficiently adjacent to the slips to prevent said slips from sliding upwardly within the bowl a substantial distance.

SHERIDAN P. TSCHAPPAT.